(12) United States Patent
Sugiyama et al.

(10) Patent No.: US 10,457,269 B2
(45) Date of Patent: Oct. 29, 2019

(54) VEHICLE ENERGY MANAGEMENT DEVICE

(71) Applicant: Mitsubishi Electric Corporation, Tokyo (JP)

(72) Inventors: Akinobu Sugiyama, Tokyo (JP); Atsushi Yoshikawa, Tokyo (JP); Yoichi Okubo, Tokyo (JP); Masataka Shirozono, Tokyo (JP); Nobutaka Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 288 days.

(21) Appl. No.: 15/000,138

(22) Filed: Jan. 19, 2016

(65) Prior Publication Data

US 2016/0304080 A1 Oct. 20, 2016

(30) Foreign Application Priority Data

Apr. 17, 2015 (JP) ................................. 2015-084783

(51) Int. Cl.
*B60W 20/12* (2016.01)
*B60W 10/06* (2006.01)
(Continued)

(52) U.S. Cl.
CPC ............ *B60W 20/12* (2016.01); *B60W 10/06* (2013.01); *B60W 10/08* (2013.01); *B60W 10/26* (2013.01);
(Continued)

(58) Field of Classification Search
CPC ... G01C 21/3469; B60W 20/12; B60W 10/26; B60W 20/20; B60W 30/16;
(Continued)

(56) References Cited

U.S. PATENT DOCUMENTS 8,204,640 B2 6/2012 Tani et al.
2010/0179714 A1 7/2010 Tani et al.
(Continued)

FOREIGN PATENT DOCUMENTS

JP 2001-289643 A 10/2001
JP 2005168295 A 6/2005
(Continued)

OTHER PUBLICATIONS

Communication dated Jan. 17, 2018, from the State Intellectual Property Office of People's Republic of China in counterpart Application No. 201610236852.X.
(Continued)

*Primary Examiner* — Adam R Mott
(74) *Attorney, Agent, or Firm* — Sughrue Mion, PLLC; Richard C. Turner

(57) ABSTRACT

A vehicle energy management device has a vehicle information receiver to receive vehicle information including a vehicle speed and a state of charge of a battery, a route information receiver to receive route information to a destination, and a processing circuitry. The processing circuitry is configured to perform: a vehicle information acquisition process of acquiring vehicle information including at least information on a vehicle speed and a state of charge of the battery; a route information acquisition process of acquiring route information to the destination; an optimal plan calculation process of making a target vehicle speed plan for the destination and a driving necessity plan for a motor, an engine, and a generator on the basis of the route information and the vehicle information; and a vehicle control process of controlling the motor, the engine, and the generator on the basis of the driving necessity plan.

9 Claims, 8 Drawing Sheets

(51) Int. Cl.
*B60W 10/08* (2006.01)
*B60W 10/26* (2006.01)
*B60W 30/14* (2006.01)
*B60W 30/16* (2012.01)
*B60W 20/20* (2016.01)

(52) U.S. Cl.
CPC .......... *B60W 20/20* (2013.01); *B60W 30/143* (2013.01); *B60W 30/16* (2013.01); *B60W 2510/244* (2013.01); *B60W 2520/10* (2013.01); *B60W 2550/142* (2013.01); *B60W 2550/143* (2013.01); *B60W 2550/402* (2013.01); *B60W 2720/10* (2013.01); *B60W 2720/103* (2013.01); *B60W 2720/106* (2013.01); *B60W 2750/308* (2013.01); *Y02T 10/6286* (2013.01); *Y02T 10/7258* (2013.01); *Y10S 903/93* (2013.01)

(58) Field of Classification Search
CPC .... B60W 30/143; B60W 10/08; B60W 10/06; B60W 2750/308; B60W 2720/106; B60W 2720/103; B60W 2550/402; B60W 2550/143; B60W 2520/10; B60W 2510/244; B60W 2550/142; B60W 2720/10; Y02T 10/7258; Y02T 10/6286; Y10S 903/93
See application file for complete search history.

(56) References Cited

U.S. PATENT DOCUMENTS

| | | | |
|---|---|---|---|
| 2010/0262408 A1 | 10/2010 | Taguchi et al. | |
| 2011/0046835 A1 | 2/2011 | Taguchi | |
| 2011/0251744 A1 | 10/2011 | Amano et al. | |
| 2014/0207357 A1* | 7/2014 | Shimotani | G08G 1/096725 701/93 |
| 2014/0288743 A1* | 9/2014 | Hokoi | B60W 20/40 701/22 |
| 2015/0046000 A1* | 2/2015 | Zhao | B60K 6/445 701/22 |
| 2015/0046132 A1* | 2/2015 | Papajewski | B60W 50/0097 703/2 |
| 2015/0210281 A1* | 7/2015 | Johansson | B60W 50/0097 701/94 |
| 2017/0240174 A1* | 8/2017 | Sawada | B60K 6/48 |

FOREIGN PATENT DOCUMENTS

| | | |
|---|---|---|
| JP | 2007-187090 A | 7/2007 |
| JP | 2009-63555 A | 3/2009 |
| JP | 2009070101 A | 4/2009 |
| JP | 2009-257124 A | 11/2009 |
| JP | 2010-4670 A | 1/2010 |
| JP | 2010-132241 A | 6/2010 |
| JP | 2010-162957 A | 7/2010 |
| JP | 2010250442 A | 11/2010 |
| JP | 2011-27472 A | 2/2011 |
| JP | 2011-162084 A | 8/2011 |
| JP | 2012127265 A | 7/2012 |
| WO | 2007/097464 A1 | 8/2007 |

OTHER PUBLICATIONS

Communication dated Aug. 16, 2016, issued by the Japan Patent Office in corresponding Japanese Application No. 2015-084783.
Communication dated Mar. 1, 2016 from the Japanese Patent Office issued in corresponding Application No. 2015-084783.
Communication dated Feb. 28, 2017, from the Japanese Patent Office in counterpart application No. 2015-084783.
Communication dated Nov. 1, 2018, from the State Intellectual Property Office of People's Republic of China in counterpart Application No. 201610236852.X.

* cited by examiner

VEHICLE ENERGY MANAGEMENT DEVICE

BACKGROUND OF THE INVENTION

Field of the Invention

The present invention relates to a vehicle energy management device, and more particularly to a vehicle energy management device which performs a management of energy of a hybrid vehicle or a plug-in hybrid vehicle.

Description of the Background Art

An electric vehicle such as a hybrid vehicle or the like provided with an engine and a motor as a power source is equipped with a vehicle energy management device which sets a driving schedule of the engine and the motor so that fuel consumption can be minimized, in accordance with route information to a destination and driving information of a preceding vehicle.

In Japanese Patent Application Laid Open Gazette No. 2010-132241, for example, disclosed is a driving support device for a hybrid vehicle, which estimates a vehicle speed pattern on the basis of route information to a destination and driving information of a preceding vehicle and then sets a driving schedule of an engine and a motor so that fuel consumption needed to get to the destination can be minimized on the basis of consumption energy obtained by calculation from the vehicle speed pattern.

Since the driving support device disclosed in Japanese Patent Application Laid Open Gazette No. 2010-132241 estimates the vehicle speed pattern on the basis of the route information to a destination and the driving information of a preceding vehicle and then sets the driving schedule of an engine and a motor so that the fuel consumption needed to get to the destination can be minimized on the basis of the consumption energy obtained by calculation from the vehicle speed pattern, when the estimated vehicle speed pattern is a pattern producing an engine output (operating point) of poor power generation efficiency, there arises a problem that the fuel consumption needed to get to the destination cannot always be minimized even if only the driving schedule of the engine and the motor is optimized.

SUMMARY OF THE INVENTION

It is an object of the present invention to provide a vehicle energy management device capable of minimizing fuel consumption needed to get to a destination.

The present invention is intended for a vehicle energy management device which is mounted on an electric vehicle and performs a management of energy of the electric vehicle, and in the present invention, the electric vehicle includes a motor and an engine which drive the electric vehicle, a generator which generates electric power by using rotating force of the engine and generates electric power when the electric vehicle is braked by the motor, and a battery which supplies electric power for driving the motor and stores electric power generated by the generator. According to the present invention, the vehicle energy management device has a vehicle information receiver to receive vehicle information including at least information on a vehicle speed of the electric vehicle and information on a state of charge of the battery, a route information receiver to receive route information to the destination, and a processing circuitry. The processing circuitry is configured to perform: a vehicle information acquisition process of acquiring vehicle information including at least information on the vehicle speed of the electric vehicle and information on a state of charge of the battery; a route information acquisition process of acquiring route information to the destination; an optimal plan calculation process of making a target vehicle speed plan for the destination and a driving necessity plan for the motor, the engine, and the generator on the basis of the route information and the vehicle information; and a vehicle control process of controlling the motor, the engine, and the generator on the basis of the driving necessity plan made by the optimal plan calculation process. In the vehicle energy management device of the present invention, the optimal plan calculation process makes the driving necessity plan and the target vehicle speed plan so that fuel consumption needed to get to the destination is minimized on the basis of the route information and the vehicle information, and the vehicle control process controls the motor, the engine, and the generator in accordance with at least the driving necessity plan.

According to the present invention, it is possible to achieve a vehicle energy management device capable of minimizing fuel consumption needed to get to a destination.

These and other objects, features, aspects and advantages of the present invention will become more apparent from the following detailed description of the present invention when taken in conjunction with the accompanying drawings.

DESCRIPTION OF THE PREFERRED EMBODIMENTS

<The First Preferred Embodiment>

<System Configuration>

Figure 1:
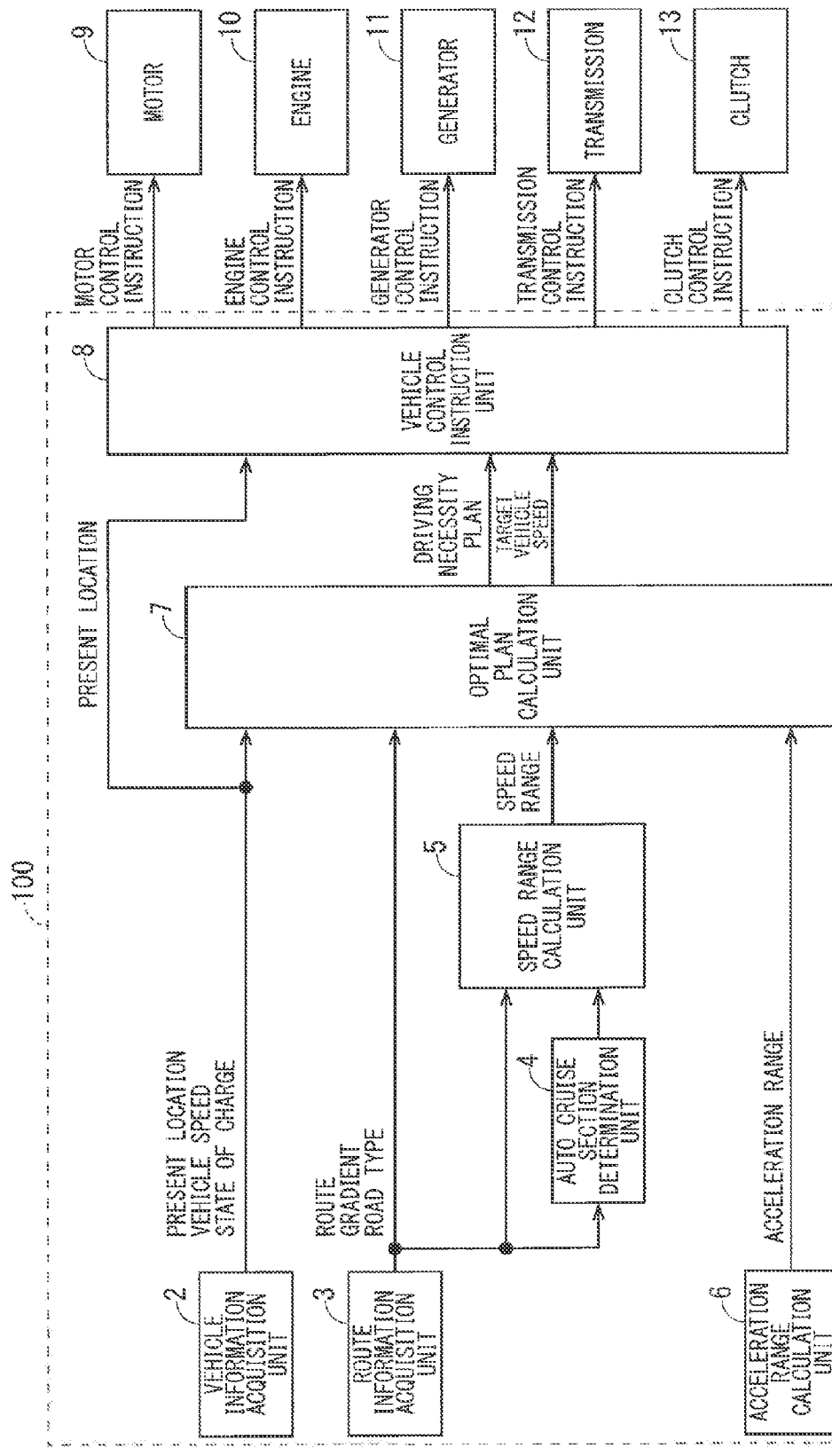
FIG. 1 is a block diagram showing a constitution of a vehicle energy management device in accordance with a first preferred embodiment of the present invention.

FIG. 1 is a block diagram showing a constitution of a vehicle energy management device 100 in accordance with the first preferred embodiment of the present invention. As shown in FIG. 1, the vehicle energy management device 100 comprises a vehicle information acquisition unit 2 for acquiring vehicle information such as a present location of a vehicle, a vehicle speed, a state of charge (the remaining amount of charge) of a not-shown battery (secondary battery), and the like, a route information acquisition unit 3 for acquiring route information from a departure place to a destination, i.e., information on a traveling route, a road gradient, a road type, and the like, an auto cruise section determination unit 4 for determining an auto cruise section on the basis of the route information acquired by the route information acquisition unit 3, a speed range calculation unit 5 for calculating a vehicle speed range allowed to the vehicle itself at each location or each section in a route toward the destination on the basis of the outputs of the route information acquisition unit 3 and the auto cruise section determination unit 4, and an acceleration range calculation unit 6.

The vehicle energy management device 100 further comprises an optimal plan calculation unit 7 for making a target vehicle speed plan for minimizing fuel consumption needed to get to the destination and a driving necessity plan for a power train actuator such as a motor, an engine, a generator, and the like by using the outputs of the vehicle information acquisition unit 2, the route information acquisition unit 3, the speed range calculation unit 5, and the acceleration range calculation unit 6, and a vehicle control instruction unit 8 for giving a control instruction to the power train actuator such as a motor 9, an engine 10, a generator 11, a transmission 12, a clutch 13, and the like in accordance with the driving necessity plan so that the vehicle speed can become a target vehicle speed at the present location.

It is assumed that the present invention is applied to an electric vehicle such as a hybrid vehicle or the like having a cruise control function for performing an auto cruise, and by giving the control instruction to the power train actuator from the vehicle control instruction unit 8 on the basis of the target vehicle speed plan and the driving necessity plan for the power train actuator which are made by the optimal plan calculation unit 7, it is possible to further reduce fuel consumption which cannot be sufficiently reduced by the conventional ACC (Adaptive Cruise Control).

The present invention, however, is effective also in a case where the auto cruise is not performed. Though the operation for selecting a traveling mode on the basis of the driving necessity plan for the power train actuator which is made by the optimal plan calculation unit 7 uses the cruise control function, when it is intended only to achieve the target vehicle speed plan made by the optimal plan calculation unit 7, an instruction for vehicle speed may be given to a driver as occasion arises. In order to give the instruction for vehicle speed, for example, an in-vehicle car navigation system can be used to give an instruction with a voice or an image. As a matter of course, when the driver intends to perform the auto cruise in an auto cruise section, the vehicle speed may be automatically set.

Herein, the route information acquisition unit 3 can use, for example, the in-vehicle car navigation system to acquire the present location through a receiver (GPS sensor) for receiving position information from a satellite positioning system such as a GPS (Global Positioning System) or the like in the car navigation system and search for the route information from incorporated map data. Further, by connecting a portable terminal, a PDA (Personal Digital Assistant), or a smartphone carried by the driver or a fellow passenger to the vehicle energy management device 100, a navigation function (application) incorporated therein may be used as the route information acquisition unit 3.

Further, the route information acquisition unit 3 may have a communication device for performing communication with a vehicle exterior server to acquire the present location of the vehicle from the vehicle information acquisition unit 2 and acquire the route information from a vehicle exterior infrastructure server such as a VICS (Vehicle Information and Communication System: registered trademark) center or the like through the communication device. As a matter of course, the vehicle energy management device 100 may have an original navigation system as the route information acquisition unit 3 to acquire the route information from incorporated map data.

As the route information, not only the traveling route, the road gradient, and the road type but also a road shape such as an intersection, a curve or the like and road information such as a state of a traffic light, construction, an accident, a traffic jam, or the like may be acquired. Some of the car navigation systems update these information in real time, and therefore it is advantageous to use the car navigation system in this point.

The vehicle information acquisition unit 2 may have a battery sensor for acquiring the state of charge of the battery to directly measure the remaining amount of charge of the battery, or may acquire information on the state of charge from an already-existing battery management unit. Alternatively, in a case where the vehicle information acquisition unit 2 has a GPS sensor, the vehicle information acquisition unit 2 may acquire the present location through the GPS sensor, or in a case where the route information acquisition unit 3 has a GPS sensor, the vehicle information acquisition unit 2 may acquire information on the present location from the route information acquisition unit 3.

The auto cruise section determination unit 4 may determine a section in which the road type of the route is an expressway or a limited highway as the auto cruise section. Further, in the future, when a road dedicated to auto cruise where humans do not drive and only automated cruise vehicles are running is provided, the auto cruise section determination unit 4 may determine a section which is the road dedicated to auto cruise as the auto cruise section. In a vehicle having an auto cruise function, the auto cruise section determination unit 4 may confirm that the driver turns on an auto cruise switch and determine a section in which the same road type (for example, an expressway) as that of the section in which the driver turns on the auto cruise switch continues, as the auto cruise section. By providing the auto cruise section determination unit 4, a target vehicle speed of excellent engine efficiency can be set even in the auto cruise section.

The speed range calculation unit 5 does not calculate a speed range for minimizing the fuel consumption but calculates a speed range on the basis of a legal speed or a speed range at which the driver does not feel any discomfort or strangeness. On a road where the legal speed is 60 km/h, for example, the speed range is set to a range of 60 to 40 km/h, and even if engine characteristics are good during running at 70 km/h, the speed range is not set to a speed exceeding the legal speed. It thereby becomes possible to travel while abiding by the legal speed.

In this case, the speed range at which the driver does not feel any discomfort or strangeness can be set on the basis of a database in which digitized discomfort or strangeness is associated with a speed. When the vehicle is running at a speed of 20 km/h on a road where the legal speed is 60 km/h, the driver feels discomfort or strangeness because of the relative speed with respect to other vehicles therearound. Therefore, the speed range is not set to a speed which is associated with a strangeness of 100 (maximum value) or the like in the database.

The upper and lower limits of the speed range may be changed depending not only on the legal speed but also on the road type such as an expressway, a general road, a mountain road or the like. For example, the speed range may be set to a range of 100 to 70 km/h on the expressway, a range of 50 to 20 km/h on the mountain road, or the like.

Further, in the auto cruise section, the vehicle speed range is not fixed to a set vehicle speed for auto cruise but a wider vehicle speed range is calculated within a range not exceeding the legal speed, where the driver does not feel any strangeness. Conversely, outside the auto cruise section, the vehicle speed range may be calculated so as to be narrower than that in the auto cruise section. By narrowing the vehicle speed range outside the auto cruise section, such a vehicle speed range that the driver does not feel any strangeness can be set.

The acceleration range calculation unit 6 does not calculate an acceleration for minimizing the fuel consumption but calculates an acceleration range at which the driver does not feel any discomfort. In this case, the acceleration range at which the driver does not feel any discomfort can be set on the basis of a database in which digitized discomfort is associated with an acceleration. It thereby becomes possible to travel while not accelerating to such a degree that the driver feels discomfort.

The acceleration range calculation unit 6 may set the acceleration range for each road type by using road type information that the route information acquisition unit 3 has.

The driving necessity plan for the power train actuator which is made by the optimal plan calculation unit 7 is a plan for determining whether to drive or stop the motor 9, the engine 10, and the generator 11 in a section in the route to the destination. In a case where the vehicle runs in an EV mode in a certain section, for example, since the engine 10 is stopped, the generator 11 is stopped, and only the motor 9 is driven, all the traveling energy is obtained from the motor 9 and therefore the remaining amount of charge of the battery decreases. Further, in a case where the vehicle runs in an HEV mode in another section, since the engine 10 is driven, the generator 11 is driven, and the motor 9 is also driven, the traveling energy is obtained from the motor 9 while the generator 11 generates electric power by using the output of the engine 10 and the battery (storage battery) is charged with the electric power, and therefore it is possible to prevent a decrease in the remaining amount of charge of the battery. In a vehicle having the transmission 12 and the clutch 13, the driving necessity plan also includes a plan for connection and release of the clutch and switching of a gear of the transmission.

The optimal plan calculation unit 7 may make the target vehicle speed plan for minimizing the fuel consumption needed to get to the destination and the driving necessity plan for the power train actuator on the basis of the outputs of the vehicle information acquisition unit 2 and the route information acquisition unit 3, or may make the target vehicle speed plan and the driving necessity plan for the power train actuator on the basis of the outputs of the vehicle information acquisition unit 2, the route information acquisition unit 3, and the speed range calculation unit 5. In the former case, since there is no condition of the speed range, fewer constraint conditions are inputted to the optimal plan and therefore the calculation load decreases. In the latter case, since the speed range is included in the constraint condition, such a target vehicle speed that the legal speed is abided by and the driver does not feel any strangeness can be set. The vehicle energy management device 100 not only makes the optimal plan at the start of the vehicle but also acquires various information as occasion arises from the start until the arrival at the destination and makes the optimal plan as necessary.

<Optimal Plan>

Next, with reference to FIG. 2, description will be made on an example of the target vehicle speed plan and the driving necessity plan for the power train actuator which are made by the optimal plan calculation unit 7.

Figure 2:
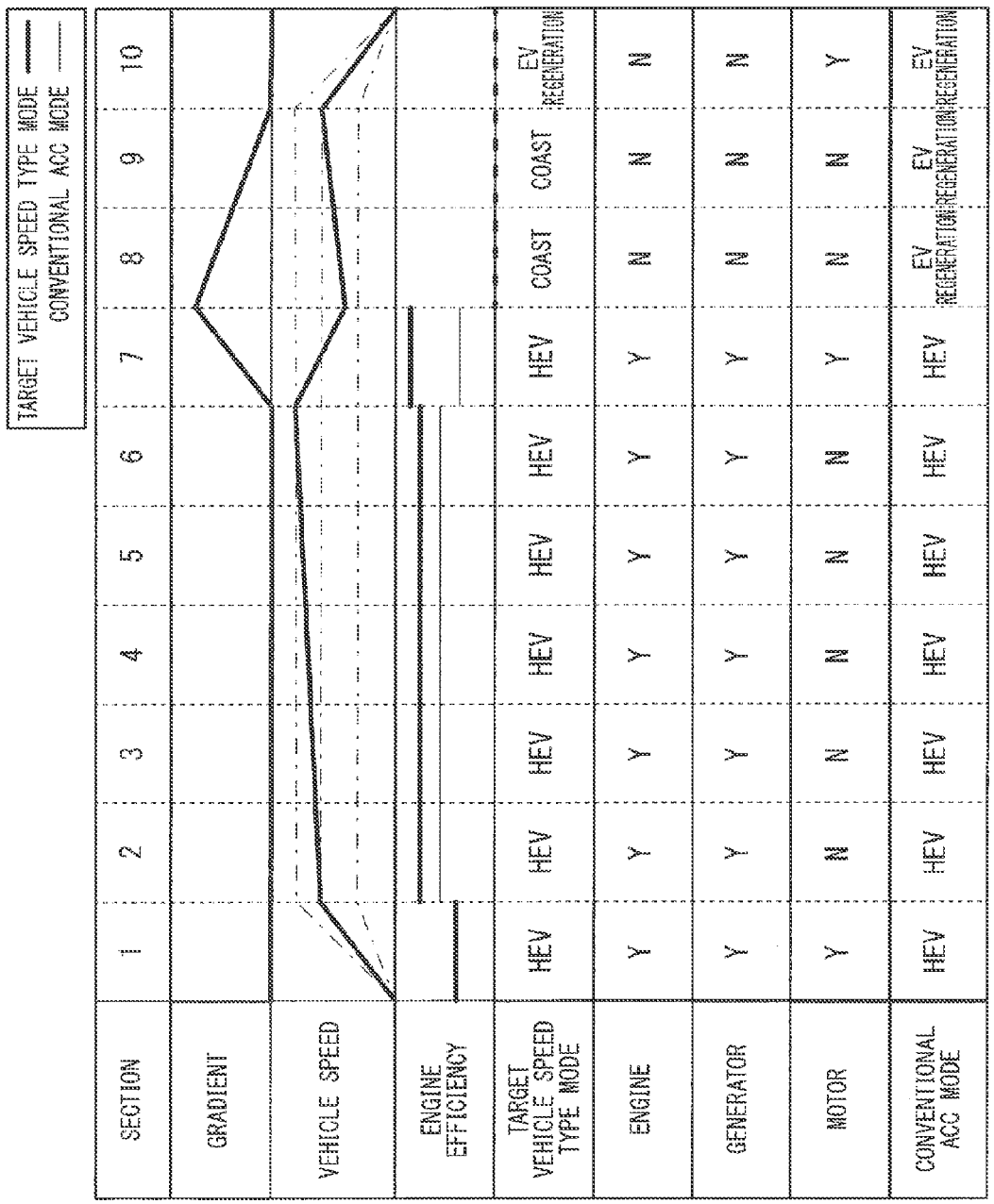
FIG. 2 is a view showing an example of a target vehicle speed plan and a driving necessity plan for a power train actuator, which are made by an optimal plan calculation unit.

FIG. 2 shows a conventional ACC mode in which the vehicle is running at a constant speed with the conventional ACC (Adaptive Cruise Control) and a target vehicle speed type mode in which the target vehicle speed plan and the driving necessity plan for the power train actuator are made together. In FIG. 2, a route from the departure place to the destination is divided into ten sections, and the road gradient information, the vehicle speed, and the engine efficiency in each section are shown. With respect to the vehicle speed, the vehicle speed range is indicated by a one-dot chain line, the vehicle speed in the conventional ACC mode is indicated by a thin solid line, and the target vehicle speed in the target vehicle speed type mode is indicated by a thick solid line. Further, with respect to the engine efficiency, the engine efficiency in the conventional ACC mode is indicated by a thin solid line, and the engine efficiency in the target vehicle speed type mode is indicated by a thick solid line.

In FIG. 2, in the section 1, the target vehicle speed in the target vehicle speed type mode is set to the same speed as the vehicle speed in the conventional ACC mode and the vehicle is running in the HEV mode where both the engine and the motor are driven to accelerate. In this section 1, there is no difference in the engine efficiency between the two modes.

In the sections 2 to 6, in the conventional ACC mode, the vehicle is running at the set constant vehicle speed, but the running at the set constant vehicle speed is not always an operating point of high engine efficiency and the engine efficiency is lower than that in the target vehicle speed type mode. On the other hand, in the target vehicle speed type mode, by planning a target vehicle speed to which the speed is increased so that an operating point of high engine efficiency can be achieved, the fuel consumption is reduced. In this case, the target vehicle speed is planned to fall within the vehicle speed range indicated by the one-dot chain line so that the driver does not feel any strangeness.

Herein, an operating point of high engine efficiency will be described. The energy (engine output) generated by the engine is determined as "engine output=rotation number (the number of rotation)×torque", and in other words, depends on the engine rotation number and the torque (engine load). As to a general engine, when the engine rotation number is large to some degree and the engine load is also large, fuel consumption efficiency becomes high. In a case of speed pattern where the vehicle speed is low and no acceleration is made, since the traveling energy is low, both the engine rotation number and the engine load are low and the engine is driven at an operating point (engine output) of poor engine efficiency, and therefore the fuel efficiency becomes low. In contrast to this, in the target vehicle speed type mode as shown in the sections 2 to 6, since the vehicle speed pattern where acceleration is made is set, not the vehicle speed pattern where the vehicle speed is low, the traveling energy becomes higher and the vehicle is running at an operating point of high engine efficiency, and therefore the fuel efficiency is improved. Further, in the sections 2 to 6, though the vehicle is running in the HEV mode, the driving necessity plan in which the motor is not driven is made in this case, and therefore the target vehicle speed may be planned in consideration of only the engine efficiency.

In the section 7 where there is a steep rising gradient, since the vehicle is running at a constant vehicle speed in the conventional ACC mode though there is a rising gradient, the engine is operating in a high output area out of the high efficiency area of the engine. Therefore, the engine efficiency becomes still lower.

In the target vehicle speed type mode, however, since the vehicle speed is decreased at the steep rising gradient and such a target vehicle speed that the engine is operating in the high efficiency area of the engine is set, the fuel consumption during the running at a steep gradient can be reduced. Further, in the section 7, since the vehicle is running in the HEV mode where the motor is also driven, the engine efficiency can be further increased.

In the sections 8 and 9 where there is a falling gradient, in the conventional ACC mode, the vehicle is running in an EV regeneration mode so that the speed becomes constant, and the battery is charged with regeneration power. Though the electric power charged in the battery is consumed in the future EV running, to thereby suppress the energy consumption, since there are a motor loss, an inverter loss, and a power storage loss in the battery in the EV regeneration mode, 100% of the energy cannot be recovered and there arises a loss.

On the other hand, in the target vehicle speed type mode, since neither the engine nor the motor is driven and inertia running (coasting) is performed at a falling gradient so that the speed can fall within a vehicle speed range set in advance, the ineffectual motor loss, inverter loss, and power storage loss can be reduced and the potential energy during the running at a falling gradient can be efficiently converted into kinetic energy. Further, since the engine is not used in the inertia running, the engine efficiency is not calculated.

Then, in the section 10 where there is no longer a falling gradient, the vehicle is getting to the destination while the speed decreases like in the conventional ACC mode. The vehicle is running in the EV regeneration mode, only the motor is driven to convert the traveling energy into electric power, and the battery is charged with the regeneration power.

Further, assuming that the sections 1 and 10 are sections where a normal driving is performed in an urban area and the sections 2 to 9 are auto cruise sections on the expressway, the vehicle speed is changed in accordance with the driver's intention during the normal driving in the urban area so that the driver does not feel any strangeness and the target vehicle speed is set only in the auto cruise sections, to thereby reduce the fuel consumption.

<Optimization Problem>

The target vehicle speed plan and the driving necessity plan for the power train actuator in the target vehicle speed type mode described above can be made by calculating an optimization problem using the fuel consumption needed to get to the destination as an objective function and the outputs of the vehicle information acquisition unit 2, the route information acquisition unit 3, the speed range calculation unit 5, and the acceleration range calculation unit 6 as constraint conditions, and minimization of the fuel consumption can be thereby achieved.

Specifically, assuming that the objective function is the fuel consumption needed from the departure place to the destination, in the exemplary case of FIG. 2, the objective function is defined by the total sum of the respective fuel consumptions in the sections 1 to 10. In this case, the traveling energy P is defined by the following Eq. (1):

[Eq. (1)]

$$P = \left(\mu_{roll} \times m_{weight} \times g \times \cos\theta + \frac{1}{2} \times \rho \times C_D \times C_S \times V_S^2 + m_{weight} \times \frac{dV_S}{dT} + m_{weight} \times g \times \sin\theta\right) \times V_S \quad (1)$$

In the above Eq. (1), "$\mu_{roll}$" represents a rolling resistance coefficient, "$m_{weight}$" represents a vehicle weight (kg), "g" represents acceleration of gravity (m/s²), "θ" represents a road gradient (rad), "ρ" represents air density (kg/m³), "$C_D$" represents an air resistance coefficient, "$C_S$" represents a forward projected area (m²), and "$V_S$" represents a vehicle speed (m/s). Travel resistance parameters such as the rolling resistance coefficient, the vehicle weight, the air resistance coefficient, the forward projected area, and the like may be held in a database inside the optimal plan calculation unit 7 or may be acquired together with the information on the vehicle speed from the vehicle information acquisition unit 2. The road gradient may be acquired from the route information acquisition unit 3.

As the constraint conditions, there are:
P<motor maximum output (in the EV mode),
P<motor maximum output+engine maximum output (in the HEV mode),
lower limit of speed range<$V_S$<upper limit of speed range
lower limit of acceleration range<$dV_S/dt$<upper limit of acceleration range,
lower limit of remaining amount of charge<remaining amount of charge<upper limit of remaining amount of charge,
engine rotation number=engine rotation number characteristics (acquired from a map using P as a variable),
engine torque=engine torque characteristics (acquired from a map using P as a variable),
fuel consumption=engine fuel characteristics (acquired from a map using rotation number and torque as variables), and the like.

The optimization process is to set such target vehicle speed and traveling mode that minimize the fuel consumption as the objective function on the basis of the above-described constraint conditions. As a technique for optimization, any one of a dynamic programming, a quadratic programming, a genetic algorithm, and the like may be used only if the combination of the target vehicle speed and the traveling mode can be set. Hereafter, as an exemplary technique, a case using the genetic algorithm will be described.

<Optimization Using Genetic Algorithm>

The genetic algorithm is an optimization technique based on the evolution of living things, which is a technique in which the gene of an individual that is strong, being adapted for the circumstances, survives into the next generation and repeatedly leaves descendants through crossover and mutation, to thereby approximate an optimal solution.

Figure 3:
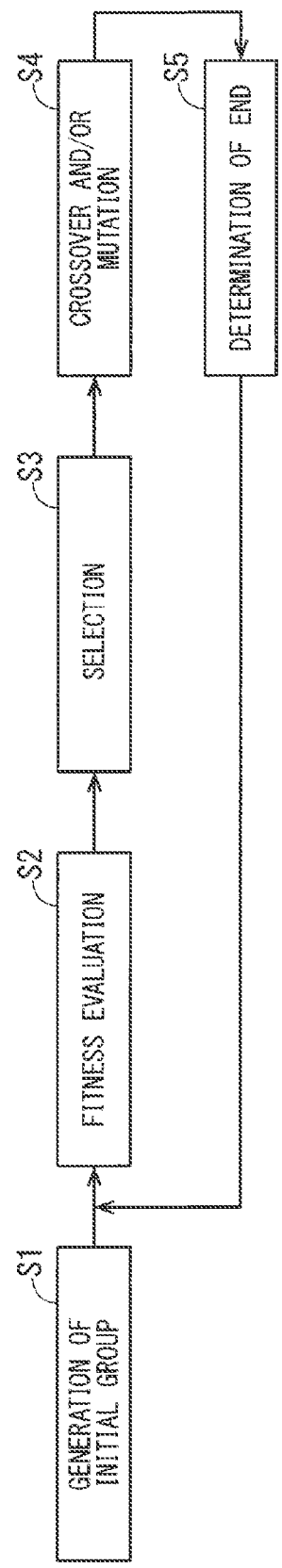
FIG. 3 is a flowchart showing an operation flow for optimization using a genetic algorithm.
Figure 4:
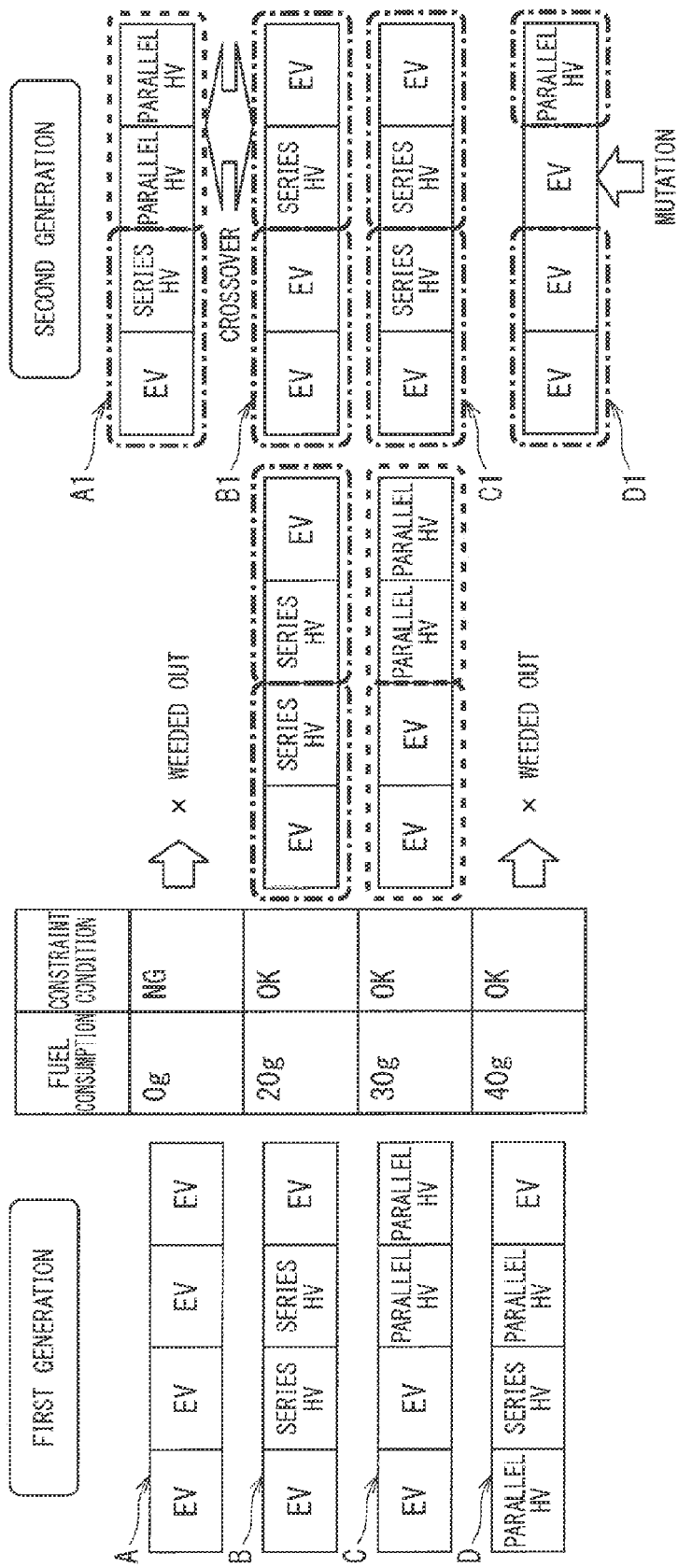
FIG. 4 is a view schematically showing a technique for optimization using the genetic algorithm

Hereinafter, with reference to FIGS. 3 and 4, an optimization technique using the genetic algorithm will be described. FIG. 3 is a flowchart showing an operation flow for the optimization technique using the genetic algorithm, and FIG. 4 is a view schematically showing the optimization technique using the genetic algorithm. In FIG. 4, for simplification, description will be made on a case where the vehicle speed is fixed and respective modes are set for four sections.

In Step S1 of FIG. 3, first, an initial group is generated. In this step, as shown in FIG. 4, four individuals A to D are prepared as the initial group in order to select a combination of modes to be set for each section from random combinations.

Specifically, the individual A is a combination to set the EV mode for all the four sections, and the individual B is a combination to set the EV mode for the first and fourth sections and set a series HV mode for all the remaining sections. The individual C is a combination to set the EV mode for the first and second sections and set a parallel HV mode for all the remaining sections, and the individual D is a combination to set the parallel HV mode for the first and third sections, set the series HV mode for the second section, and set the EV mode for the fourth section. The individuals A to D which are thus generated randomly are referred to as a first generation.

Herein, the series HV mode refers to a mode in which the clutch between the engine and tires is released, electric power is generated by a driving power of the engine, and with the generated electric power, the motor is driven to cause the vehicle to travel and the battery is charged. The parallel HV mode refers to a mode in which the clutch between the engine and the tires is connected and the vehicle is caused to travel by only the driving power of the engine, but as necessary, the motor is driven by the electric power of the battery and the vehicle is caused to travel by the driving powers of both the engine and the motor.

Next, in Step S2 of FIG. 3, fitness evaluation is performed. In this step, as shown in a table of FIG. 4 which indicates whether or not the constraint condition is satisfied with respect to each fuel consumption, first, the fuel consumption for each of the individuals A to D is calculated and then it is determined whether or not the constraint condition is satisfied with respect to each fuel consumption.

In FIG. 4, with respect to the individual A, since only the EV mode is set for all the sections, the fuel consumption becomes a minimum (0 g), but since the remaining amount of charge of the battery as the constraint condition is lower than the lower limit, the constraint condition is not satisfied (NG) and the individual A is weeded out. With respect to the other individuals, the constraint condition is satisfied (OK), but the individual D is weeded out since the fuel consumption is the maximum (40 g), and the individuals B and C survive since the respective fuel consumptions are low. Thus, the selection in Step S3 of FIG. 3 is ended.

Next, in Step S4 of FIG. 3, the surviving individuals are recombined to cause crossover and/or mutation, and individuals of the next generation are thereby generated. Specifically, as shown in FIG. 4, the individuals B and C are divided into a set of the first and second sections and a set of the third and fourth sections of the respective individuals and these sets are recombined, to thereby generate individuals A1, B1, C1, and D1 as the individuals of the second generation. At that time, the respective third and fourth sections of the individuals B and C are crossed over, to thereby generate the individuals A1 and B1. Further, the individual C1 has the same combination as that of the individual B, and the individual D1 has a combination in which the third section of the individual C is mutated to the EV mode.

For the individuals of the next generation which are thus generated, the fitness evaluation in Step S2, the selection in Step S3, and the recombination of the individuals in Step S4 are repeated until a predetermined end condition is satisfied, and when it is determined in Step S5 that the end condition is satisfied, the individual with the lowest fuel consumption at this time is determined as the optimized plan. In this case, as the predetermined end condition, for example, by setting a threshold value for the number of repetitions of Steps S2 to S4, it may be determined that the process is ended if the number of repetitions of Steps S2 to S4 reaches the threshold value, or by setting a learning end threshold value for the objective function, it may be determined that the process is ended if the objective function becomes not higher than this threshold value.

Further, though the case has been shown, for simplification, where the vehicle speed is fixed and only the traveling mode is set in the above description, an optimal plan of the target vehicle speed and the traveling mode can be made by taking into consideration the types of vehicle speed such as the acceleration in the EV mode, no speed change in the EV mode, the deceleration in the EV mode, the acceleration in the HEV mode, no speed change in the HEV mode, the deceleration in the HEV mode, and the like.

Furthermore, though the fuel consumption needed to get to the destination is used as the objective function in the above-described description, any value such as the consumption energy, the fuel efficiency, the carbon dioxide ($CO_2$) emissions, the fuel expenses, or the like can be used as the objective function.

Though the optimization technique using the genetic algorithm has been described above, the optimization may be performed by using the dynamic programming or the quadratic programming.

The dynamic programming is a technique in which the optimization problem to be calculated is divided into a plurality of partial problems, respective solutions of the partial problems are obtained, and a combination which satisfies the constraint conditions and minimizes the objective function is obtained. When the dynamic programming is applied to the vehicle energy management device, respective partial problems for those sections are defined and combinations of the traveling modes and the vehicle speeds allowed in the sections are obtained, respectively. Then, out of these combinations, a solution which satisfies the constraint conditions such as the remaining amount of charge of the battery and the speed range and has the lowest fuel consumption is sought out. Unlike the genetic algorithm, since almost all the possible combinations of the vehicle speeds and the traveling modes are obtained, the amount of calculation increases.

The quadratic programming is a technique in which all the objective functions and the constraint conditions are defined by quadratic expression and/or linear expression and an optimal solution is obtained on the basis of the formulae. Since all the formulae are expressed by quadratic expression and/or linear expression and the local maximum value and the local minimum value are found where the derivative is 0 in differentiation, the optimal solution can be obtained by solving differential equations.

<Addition of Penalty Term>

Though the case has been shown where the fuel consumption needed from the departure place to the destination is used as the objective function and the solution of the optimization problem is obtained so that the fuel consumption may be minimized in the above description, not only the plans in which the fuel consumption is not the lowest but also plans in which the vehicle speed is out of the vehicle speed range or the acceleration is out of the acceleration range may be added as penalty terms. By adding the penalty terms, it is possible to make the optimal plan not only for minimizing the fuel consumption but also on the basis of comfort of the driver and various evaluation indices.

For example, the objective function is defined by the following Eq. (2):

[Eq. (2)]

fuel consumption needed from departure place to destination+penalty term out of vehicle speed range+penalty term out of acceleration range=fuel consumption of section 1+ . . . +fuel consumption of section 10+vehicle speed penalty factor of section 1×deviation amount from vehicle speed range of section 1+ . . . +vehicle speed penalty factor of section 10×deviation amount from vehicle speed range of section 10+acceleration penalty factor of section 1×deviation amount from acceleration range of section 1+ . . . +acceleration penalty factor of section 10×deviation amount from acceleration range of section 10  (2)

As described above, in the case where the constraint conditions of the optimization problem include the conditions of the vehicle speed range and the acceleration range, when the constraint conditions are not satisfied, the solution cannot be obtained. In a case where the constraint condition is strict, such as where the speed range of a section is narrow or the like, there is a possibility that the solution cannot be obtained even if the optimization technique is used. Then, by including the speed range which is the constraint condition in the objective function, the speed range gets out of the constraint condition in the optimization problem and it becomes easier to obtain the optimal solution.

In order to prevent the solution out of the speed range from being obtained, however, as shown in Eq. (2), the equation is made so that the objective function increases in accordance with the deviation amount from the speed range, to thereby obtain a solution not out of the speed range even if the objective function is the minimum.

<Device Operation>

Figure 5:
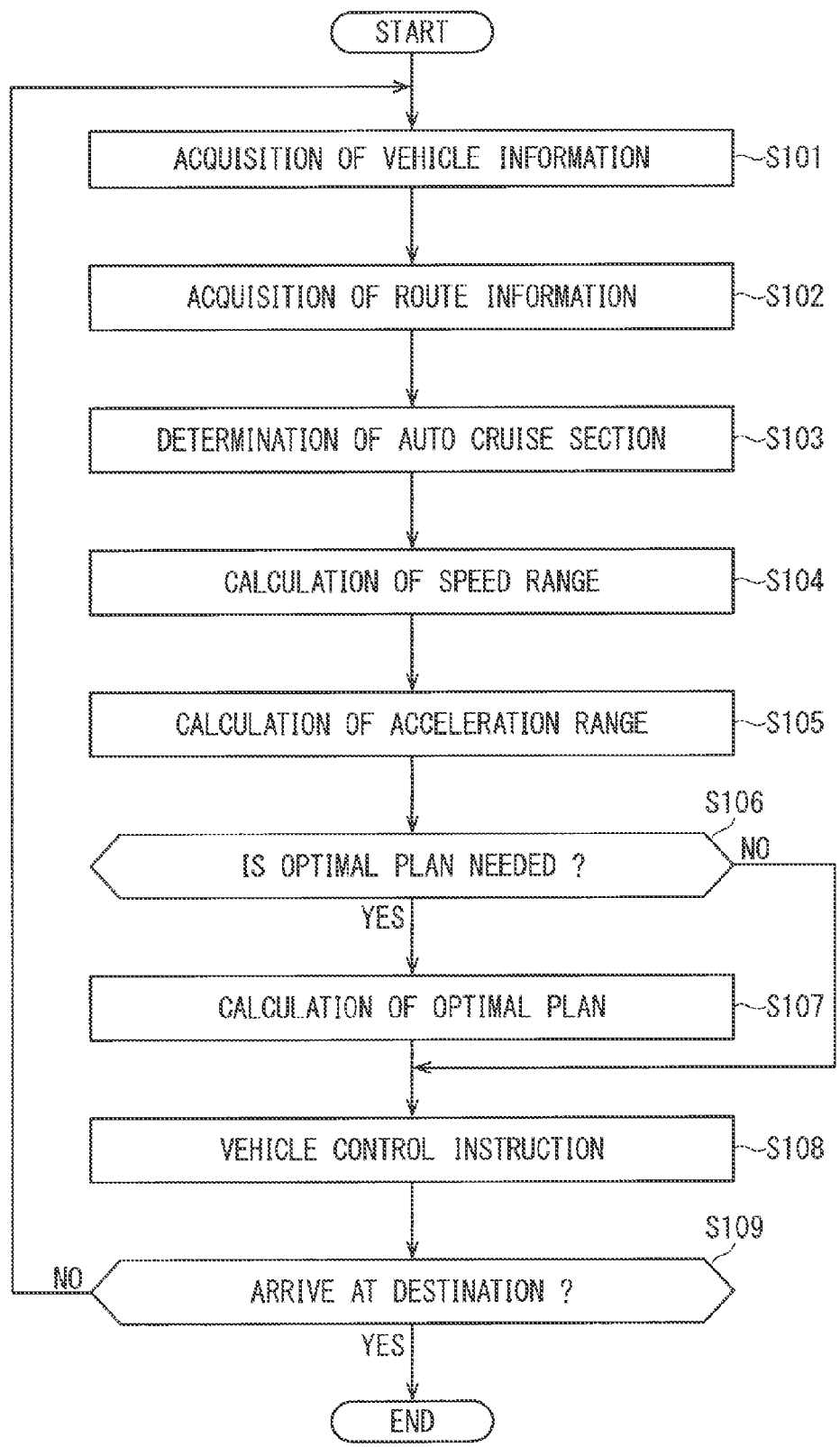
FIG. 5 is a flowchart showing an operation of the vehicle energy management device in accordance with the first preferred embodiment of the present invention.

Next, with reference to the flowchart of FIG. 5, description will be made on an operation of the vehicle energy management device 100 in accordance with the first preferred embodiment.

First, the vehicle energy management device 100 uses the vehicle information acquisition unit 2 to acquire the vehicle information such as the present location, the vehicle speed, the state of charge of the battery, and/or the like (Step S101).

Subsequently, the route information acquisition unit 3 acquires the route information such as the traveling route to the destination, the gradient, the road type, and/or the like (Step S102).

Next, the auto cruise section determination unit 4 determines an auto cruise section in the route (Step S103).

Still next, the speed range calculation unit 5 calculates the speed range (Step S104).

Subsequently, the acceleration range calculation unit 6 calculates the acceleration range (Step S105).

Next, the optimal plan calculation unit 7 determines whether or not the calculation of the optimal plan is needed (Step S106), and when it is determined that the calculation of the optimal plan is not needed, the process goes to Step S108. In Step S106, it is determined that the calculation of the optimal plan is needed in the cases where the vehicle speed acquired by the vehicle information acquisition unit 2 deviates from the target vehicle speed by a certain threshold value or more, where the traveling route is changed, where the driver turns on or off the auto cruise switch, and the like. By determining whether or not the calculation of the optimal plan is needed, it is possible to reduce the number of calculations of the optimal plan and decrease the calculation load.

When it is determined that the calculation of the optimal plan is needed in Step S106, the optimal plan calculation unit 7 makes the driving necessity plan for the power train actuator and the target vehicle speed plan (Step S107).

Subsequently, the vehicle control instruction unit 8 gives the control instruction to the power train actuator such as the motor, the engine, the generator, and the like so that the vehicle speed can become the target vehicle speed at the present location, in accordance with the driving necessity plan for the actuator (Step S108).

Next, it is checked whether or not the vehicle has arrived at the destination. In the case where the vehicle has arrived at the destination, the energy management is finished, and in the case where the vehicle has not arrived at the destination yet, the process steps S101 to S109 are repeated (Step S109).

<The Second Preferred Embodiment>

<System Configuration>

Figure 6:
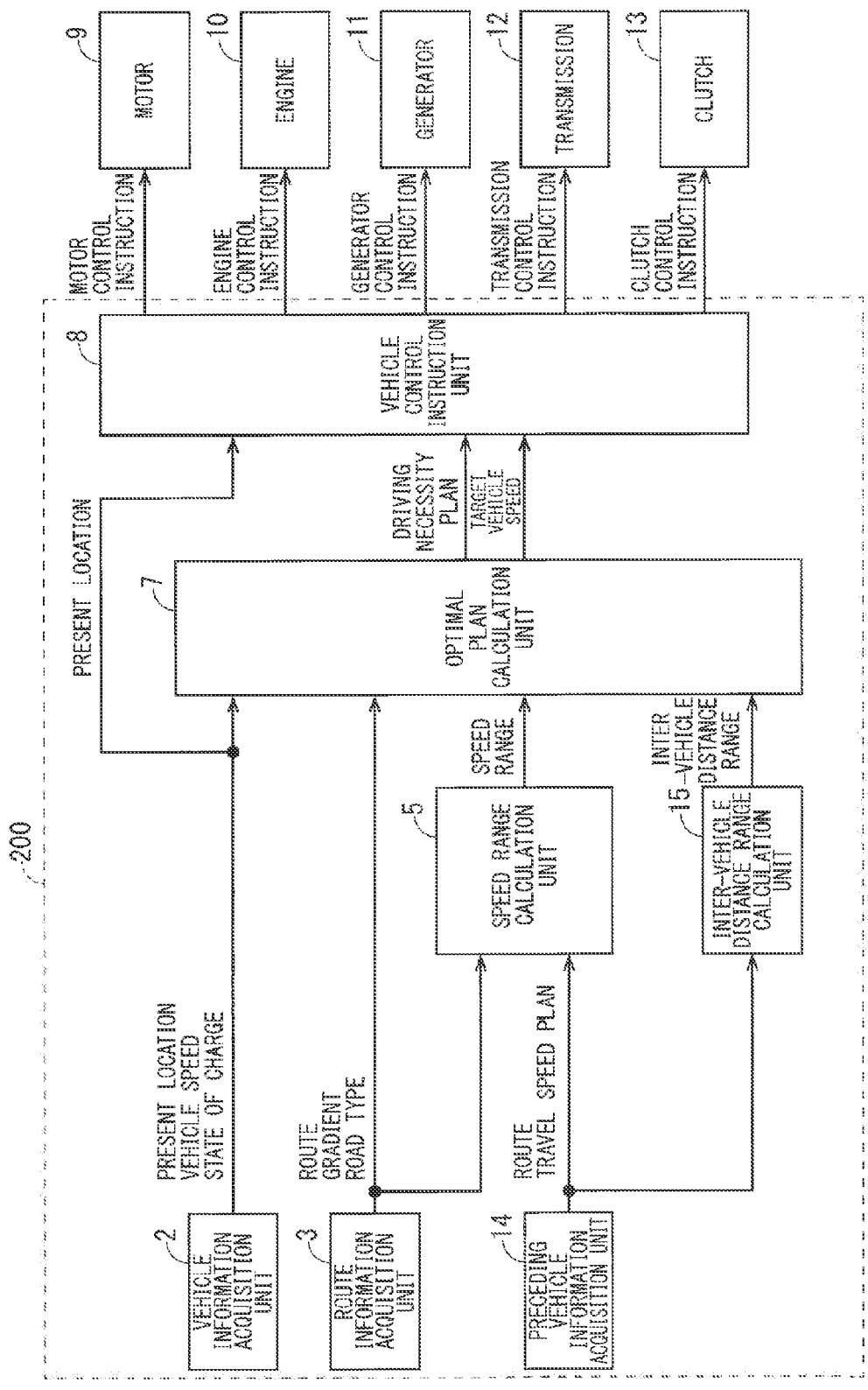
FIG. 6 is a block diagram showing a constitution of a vehicle energy management device in accordance with a second preferred embodiment of the present invention.

FIG. 6 is a block diagram showing a constitution of a vehicle energy management device 200 in accordance with the second preferred embodiment of the present invention. As shown in FIG. 6, the vehicle energy management device 200 does not comprise the auto cruise section determination unit 4 or the acceleration range calculation unit 6 included in the vehicle energy management device 100 of the first preferred embodiment described with reference to FIG. 1 but comprises a preceding vehicle information acquisition unit 14 for acquiring preceding vehicle information such as a route, a travel speed plan, and the like of a preceding vehicle and an inter-vehicle distance range calculation unit 15 for calculating an inter-vehicle distance range between the vehicle itself and the preceding vehicle on the basis of the output of the preceding vehicle information acquisition unit 14.

Further, the speed range calculation unit 5 calculates a vehicle speed range allowed to the vehicle itself on the basis of the outputs of the route information acquisition unit 3 and the preceding vehicle information acquisition unit 14. The optimal plan calculation unit 7 makes the target vehicle speed plan for minimizing the fuel consumption needed to get to the destination and the driving necessity plan for the power train actuator such as the motor, the engine, the generator, and the like by using the outputs of the vehicle information acquisition unit 2, the route information acquisition unit 3, the speed range calculation unit 5, and the inter-vehicle distance range calculation unit 15. Since the vehicle information acquisition unit 2, the route information acquisition unit 3, and the vehicle control instruction unit 8 are the same as those in the vehicle energy management device 100 of the first preferred embodiment, the description thereof will be omitted.

The preceding vehicle information acquisition unit 14 may acquire the preceding vehicle information by inter-vehicle communication with the preceding vehicle, or may acquire the preceding vehicle information by communication with an infrastructure server such as the VICS (registered trademark) or the like.

Further, as to the route of the preceding vehicle, there may be a case where the route of the preceding vehicle is compared with the route of the vehicle itself which is acquired by the route information acquisition unit 3 and only the section where both the mutes coincide with each other is determined as the route of the preceding vehicle. The preceding vehicle information may include only information of an immediately preceding vehicle, or may include information of a plurality of preceding vehicles running within a predetermined range from the vehicle itself.

The speed range calculation unit 5 does not calculate a speed range for minimizing the fuel consumption but calculates a speed range on the basis of a legal speed or a speed range at which the driver does not feel any discomfort or strangeness, and in a section where there is a preceding vehicle, the speed range calculation unit 5 does not fix a speed range in accordance with the travel speed plan of the preceding vehicle but calculates a speed range which can be achieved even when there is a preceding vehicle. Specifically, when the vehicle is running in accordance with the travel speed plan of the preceding vehicle, if the vehicle speed pattern in the travel speed plan of the preceding vehicle is a pattern of poor engine efficiency, the engine efficiency of the vehicle itself also becomes poor and therefore the speed range is not fixed in accordance with the travel speed plan of the preceding vehicle. In the section where there is a preceding vehicle, however, the upper limit value and the lower limit value are set lower than those in the section there is no preceding vehicle so that the vehicle does not become too close to the preceding vehicle.

Therefore, the target vehicle speed of high engine efficiency can be set even when there is a preceding vehicle and the fuel consumption needed to get to the destination can be thereby reduced.

The inter-vehicle distance range calculation unit 15 does not calculate a fixed inter-vehicle distance unlike in the conventional auto cruise control, but calculates an inter-vehicle distance range which is within a predetermined range from the vehicle itself. In a case, for example, where a route of the preceding vehicle is found from the preceding vehicle information acquired by the preceding vehicle information acquisition unit 14, the route is compared with the route of the vehicle itself and in the section where both the routes coincide with each other, the inter-vehicle distance range between the vehicle itself and the preceding vehicle is set within a predetermined range.

In this case, the optimal plan calculation unit 7 makes the target vehicle speed plan and the driving necessity plan for the power train actuator such as the motor, the engine, the generator, and the like by solving the optimization problem with minimization of the fuel consumption needed to get to the destination as the objective function and with the outputs of the vehicle information acquisition unit 2, the route information acquisition unit 3, the speed range calculation unit 5, and the inter-vehicle distance range calculation unit 15 as the constraint conditions.

<Optimal Plan>

Next, with reference to FIG. 7, description will be made on an example of traveling mode set on the basis of the target vehicle speed plan and the driving necessity plan for the power train actuator, which are made by the optimal plan calculation unit 7.

Figure 7:
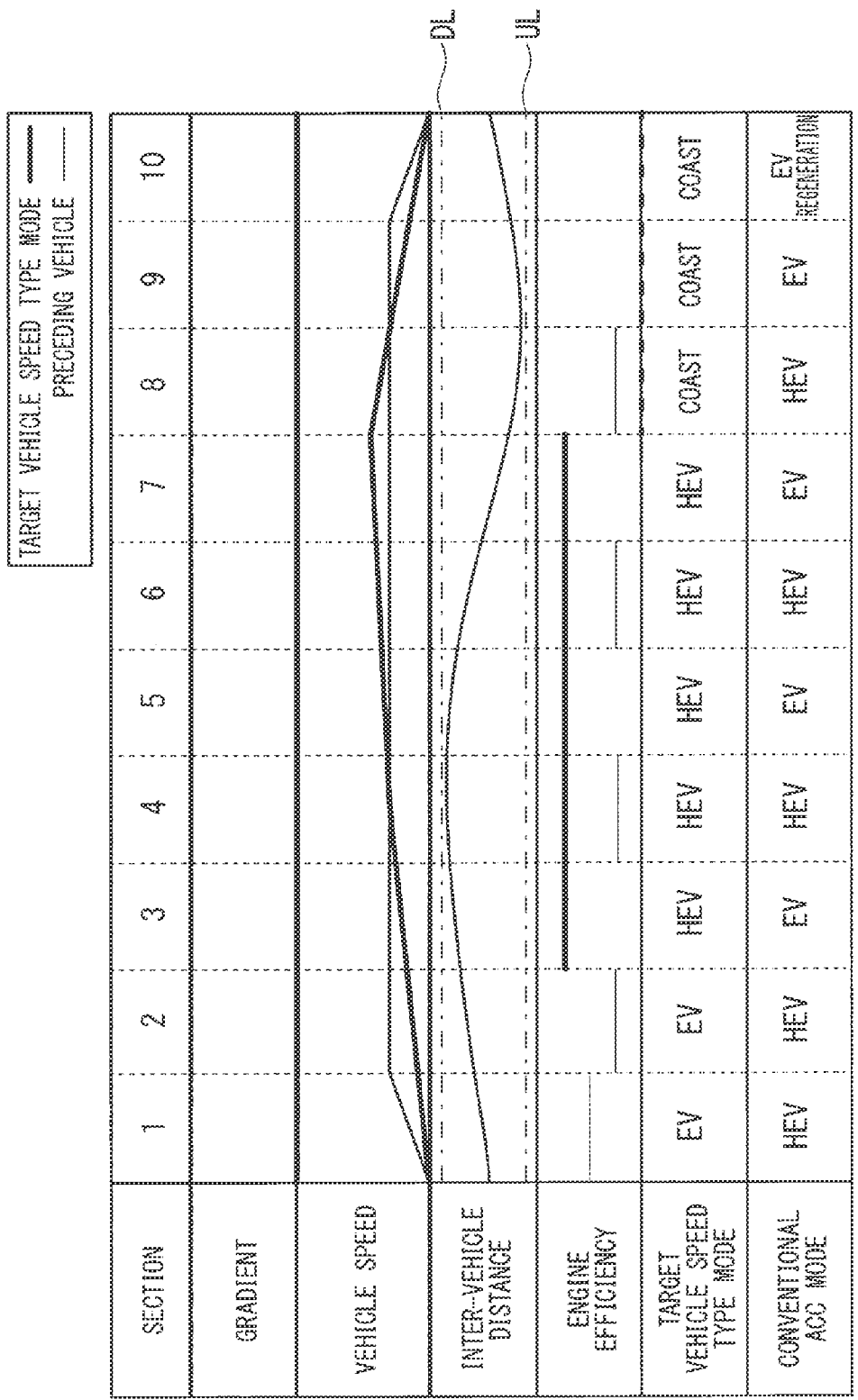
FIG. 7 is a view showing an example of a target vehicle speed plan and a driving necessity plan for a power train actuator, which are made by an optimal plan calculation unit.

FIG. 7 shows a traveling mode in which the preceding vehicle is running at a constant speed with the conventional ACC and a target vehicle speed type mode in which the target vehicle speed plan and the driving necessity plan for the power train actuator are made together in consideration of the inter-vehicle distance from the preceding vehicle. In FIG. 7, a route from the departure place to the destination is divided into ten sections, and the road gradient information, the vehicle speed, the inter-vehicle distance, and the engine efficiency in each section are shown. With respect to the inter-vehicle distance, a lower limit value DL and an upper limit value UL of the inter-vehicle distance are indicated by a one-dot chain line, and with respect to the vehicle speed, the vehicle speed of the preceding vehicle in the conventional ACC mode is indicated by a thin solid line, and the target vehicle speed of the vehicle itself is indicated by a thick solid line. Further, with respect to the engine efficiency, the engine efficiency of the preceding vehicle is indicated by a thin solid line, and the engine efficiency of the vehicle itself is indicated by a thick solid line.

In FIG. 7, the preceding vehicle increases a speed so as to reach a constant speed set in the ACC in the section 1 and runs at the constant speed in the sections 2 to 9. The preceding vehicle selects the HEV mode when the remaining amount of charge of the battery becomes low and selects the EV mode when the remaining amount of charge is recovered.

On the other hand, since the vehicle itself in the target vehicle speed type mode increases a speed so that the inter-vehicle distance from the preceding vehicle falls within the inter-vehicle distance range (between the lower limit value DL and the upper limit value UL) calculated by the inter-vehicle distance range calculation unit 15, the increase of speed continues from the section 1 to the section 7. For this reason, as the speed of the vehicle itself becomes closer to that of the preceding vehicle, the inter-vehicle distance decreases and becomes closer to the lower limit value DL, and as the vehicle speed decreases so that the inter-vehicle distance does not become lower than the lower limit value DL, the inter-vehicle distance increases.

Further, since the engine efficiency is bad at a low speed and therefore the EV mode is selected in the sections 1 and 2, the engine efficiency is not displayed in these sections.

The vehicle itself runs in the HEV mode in the sections 3 to 7 to thereby increase the engine efficiency, and performs a coast to decrease the speed in the sections 8 to 10 which are near the destination, to thereby reach the destination without any motor loss or inverter loss.

By making such target vehicle speed plan and driving necessity plan, it is possible to run while reducing the fuel consumption even when there is a preceding vehicle.

The optimal plan calculation unit 7 uses minimization of the fuel consumption needed to get to the destination as the objective function, and the travel resistance parameters such as the rolling resistance coefficient, the vehicle weight, the air resistance coefficient, the forward projected area, and the like which are needed to calculate the fuel consumption serving as the objective function may be held in the database inside the optimal plan calculation unit 7 or may be acquired together with the information on the vehicle speed from the vehicle information acquisition unit 2.

Further, as a technique for optimization, any one of the genetic algorithm, the dynamic programming, and the quadratic programming can be used, and any value other than the fuel consumption needed to get to the destination, such as the consumption energy, the fuel efficiency, the carbon dioxide ($CO_2$) emissions, the fuel expenses, or the like can be used as the objective function.

Furthermore, the plans in which the vehicle speed is out of the vehicle speed range or the acceleration is out of the acceleration range may be added as penalty terms to the objective function. By adding the penalty terms, it is possible to make the optimal plan not only for minimizing the fuel consumption but also on the basis of comfort of the driver and various evaluation indices.

<Device Operation>

Figure 8:
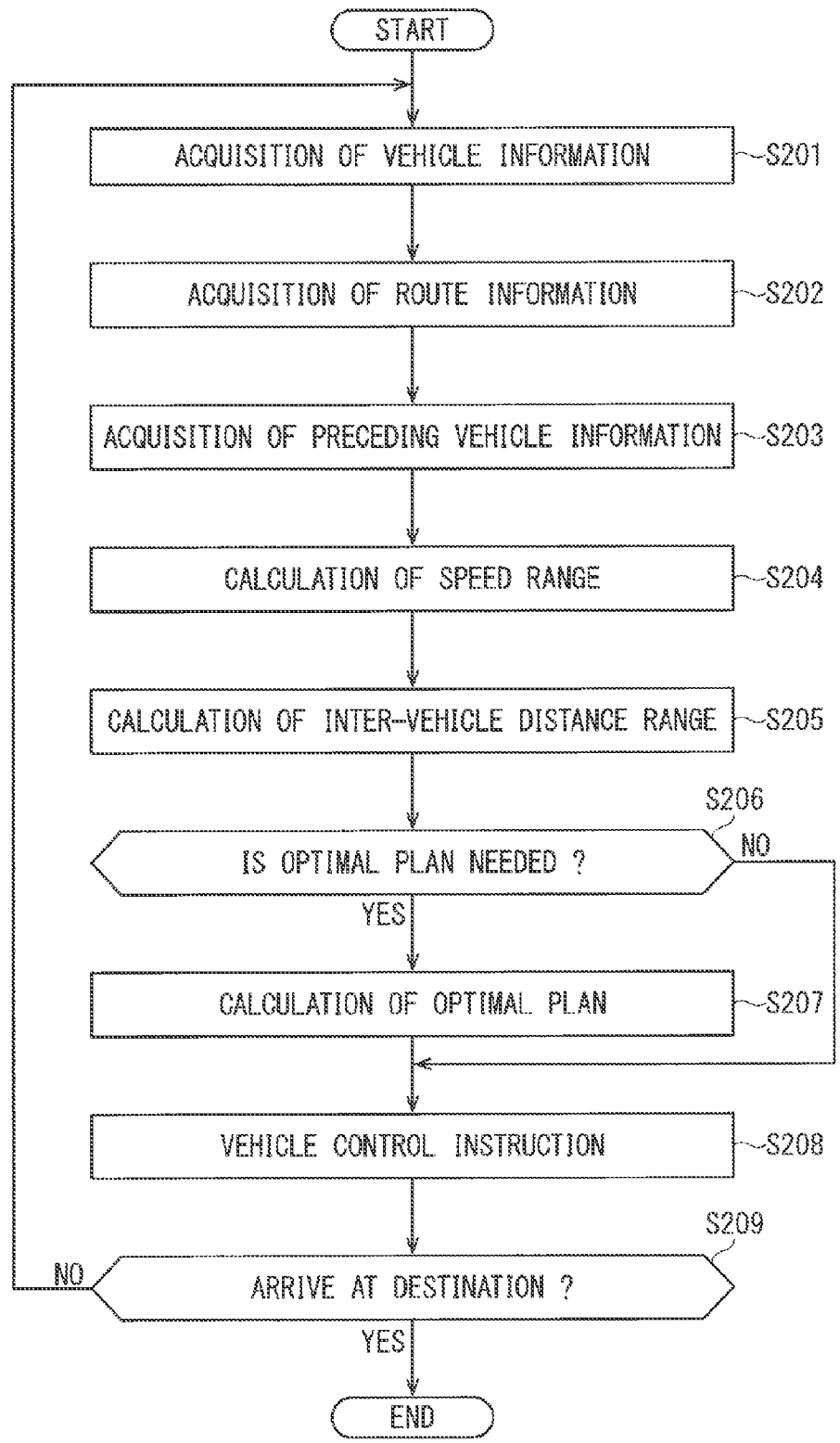
FIG. 8 is a flowchart showing an operation of the vehicle energy management device in accordance with the second preferred embodiment of the present invention.

Next, with reference to the flowchart of FIG. 8, description will be made on an operation of the vehicle energy management device 200 in accordance with the second preferred embodiment.

First, the vehicle energy management device 200 uses the vehicle information acquisition unit 2 to acquire the vehicle information such as the present location, the vehicle speed, the state of charge of the battery, and/or the like (Step S201).

Subsequently, the route information acquisition unit 3 acquires the route information such as the traveling route to the destination, the gradient, the road type, and/or the like (Step S202).

Next, the preceding vehicle information acquisition unit 14 acquires the information on preceding vehicle (Step S203).

Still next, the speed range calculation unit 5 calculates the speed range (Step S204).

Subsequently, the inter-vehicle distance range calculation unit 15 calculates the inter-vehicle distance range (Step S205).

Next, the optimal plan calculation unit 7 determines whether or not the calculation of the optimal plan is needed (Step S206), and when it is determined that the calculation of the optimal plan is not needed, the process goes to Step S208. In Step S206, it is determined that the calculation of the optimal plan is needed in the cases where the vehicle speed acquired by the vehicle information acquisition unit 2 deviates from the target vehicle speed by a certain threshold value or more, where the traveling route is changed, where the route of the preceding vehicle and/or the travel speed plan of the preceding vehicle is changed, and the like. By determining whether or not the calculation of the optimal plan is needed, it is possible to reduce the number of calculations of the optimal plan and decrease the calculation load.

When it is determined that the calculation of the optimal plan is needed in Step S206, the optimal plan calculation unit 7 makes the driving necessity plan for the power train actuator and the target vehicle speed plan (Step S207).

Subsequently, the vehicle control instruction unit 8 gives the control instruction to the power train actuator such as the motor, the engine, the generator, and the like so that the vehicle speed can become the target vehicle speed at the present location, in accordance with the driving necessity plan for the actuator (Step S208).

Next, it is checked whether or not the vehicle has arrived at the destination. In the case where the vehicle has arrived at the destination, the energy management is finished, and in the case where the vehicle has not arrived at the destination yet, the process steps S201 to S209 are repeated (Step S209).

While the invention has been shown and described in detail, the foregoing description is in all aspects illustrative and not restrictive. It is therefore understood that numerous modifications and variations can be devised without departing from the scope of the invention.

What is claimed is:

1. A vehicle energy management device which is mounted on an electric vehicle and performs a management of energy of said electric vehicle,
said electric vehicle comprising
a motor and an engine which drive said electric vehicle,
a generator which generates electric power by using rotating force of said engine and generates electric power when said electric vehicle is braked by said motor, and
a battery which supplies electric power for driving said motor and stores electric power generated by said generator,
said vehicle energy management device comprising:
a vehicle information receiver to receive vehicle information including at least information on a vehicle speed of said electric vehicle and information on a state of charge of said battery;
a route information receiver to receive route information to a destination; and
a processing circuitry configured to perform
a vehicle information acquisition process of acquiring vehicle information including at least information on said vehicle speed of said electric vehicle and information on said state of charge of said battery,
a route information acquisition process of acquiring route information to said destination,
an optimal plan calculation process of making a target vehicle speed plan for said destination and a driving necessity plan for said motor, said engine, and said generator on the basis of said route information and said vehicle information, and
a vehicle control process of controlling said motor, said engine, and said generator on the basis of said driving necessity plan made by said optimal plan calculation process,
wherein said optimal plan calculation process makes said driving necessity plan and said target vehicle speed plan in consideration of engine efficiency so that fuel consumption needed to get to said destination is minimized by calculating an optimization problem with at least said route information and said vehicle information as constraint conditions by using said fuel consumption needed to get to said destination as an objective function on the basis of said route information and said vehicle information,
said vehicle control process controls said motor, said engine, and said generator in accordance with at least said driving necessity plan,
said processing circuitry is configured to perform a speed range calculation process of calculating a speed range allowed in a route toward said destination on the basis of said route information, and
said optimal plan calculation process makes said driving necessity plan and said target vehicle speed plan using also said speed range calculated by said speed range calculation process as a constraint condition.

2. The vehicle energy management device according to claim 1, wherein
said speed range is set to a range not exceeding a legal speed.

3. The vehicle energy management device according to claim 1, wherein
said processing circuitry is configured to further perform an acceleration range calculation process of calculating an acceleration range allowed in said route toward said destination on the basis of said route information, and
said optimal plan calculation process makes said driving necessity plan and said target vehicle speed plan using also said acceleration range calculated by said acceleration range calculation process as a constraint condition.

4. The vehicle energy management device according to claim 3, wherein
said acceleration range is set based on a difference between the vehicle speed of the electric vehicle and a speed of one or more other vehicles in vicinity of the electric vehicle.

5. The vehicle energy management device according to claim 1, wherein
said processing circuitry is configured to further perform an auto cruise section determination process of determining an auto cruise section in said route toward said destination on the basis of said route information, and
said speed range calculation process calculates said speed range including also said auto cruise section determined by said auto cruise section determination process.

6. The vehicle energy management device according to claim 5, wherein
said speed range calculation process performs a calculation so that an extent of said speed range in a section other than said auto cruise section is narrower than that in said auto cruise section.

7. The vehicle energy management device according to claim 1, wherein
said route information includes at least road gradient information.

8. A vehicle energy management device which is mounted on an electric vehicle and performs a management of energy of said electric vehicle,
said electric vehicle comprising
a motor and an engine which drive said electric vehicle,
a generator which generates electric power by using rotating force of said engine and generates electric power when said electric vehicle is braked by said motor, and
a battery which supplies electric power for driving said motor and stores electric power generated by said generator,
said vehicle energy management device comprising:
a vehicle information receiver to receive vehicle information including at least information on a vehicle speed of said electric vehicle and information on a state of charge of said battery;
a route information receiver to receive route information to a destination;
a processing circuitry configured to perform
a vehicle information acquisition process of acquiring vehicle information including at least information on said vehicle speed of said electric vehicle and information on said state of charge of said battery,
a route information acquisition process of acquiring route information to said destination,
an optimal plan calculation process of making a target vehicle speed plan for said destination and a driving necessity plan for said motor, said engine, and said generator on the basis of said route information and said vehicle information, and
a vehicle control process of controlling said motor, said engine, and said generator on the basis of said driving necessity plan made by said optimal plan calculation process,
wherein said optimal plan calculation process makes said driving necessity plan and said target vehicle speed plan in consideration of engine efficiency so that fuel consumption needed to get to said destination is minimized by calculating an optimization problem with at least said route information and said vehicle information as constraint conditions by using said fuel consumption needed to get to said destination as an objective function on the basis of said route information and said vehicle information,
said vehicle control process controls said motor, said engine, and said generator in accordance with at least said driving necessity plan,
said processing circuitry is configured to perform a speed range calculation process of calculating a speed range allowed in a route toward said destination on the basis of said route information,
said optimal plan calculation process makes said driving necessity plan and said target vehicle speed plan using also said speed range calculated by said speed range calculation process as a constraint condition,
said vehicle energy management device comprises a preceding vehicle information receiver to receive preceding vehicle information including a route and a travel speed plan of a preceding vehicle,
said speed range calculation process calculates said speed range on the basis of said route information and said preceding vehicle information, and
said speed range in a section where said preceding vehicle is present is set to a range different from that in a section where said preceding vehicle is not present.

9. The vehicle energy management device according to claim 8, wherein
said processing circuitry is configured to further perform an inter-vehicle distance range calculation process of calculating an inter-vehicle distance range between said electric vehicle and said preceding vehicle on the basis of said preceding vehicle information, and
said optimal plan calculation process makes said driving necessity plan and said target vehicle speed plan including also said inter-vehicle distance range calculated by said inter-vehicle distance range calculation process.

* * * * *